United States Patent [19]
Mok

[11] Patent Number: 5,629,814
[45] Date of Patent: May 13, 1997

[54] AUTOMATIC TRACKING CONTROL APPARATUS AND METHOD

[75] Inventor: Dong K. Mok, Kyungki-do, Rep. of Korea

[73] Assignee: Goldstar Co., Ltd., Seoul, Rep. of Korea

[21] Appl. No.: 186,616

[22] Filed: Jan. 26, 1994

[30] Foreign Application Priority Data

Jan. 27, 1993 [KR] Rep. of Korea ............... 1012/1993
Mar. 5, 1993 [KR] Rep. of Korea ............... 3318/1993

[51] Int. Cl.⁶ .................... G11B 15/467; G11B 5/584
[52] U.S. Cl. ............................. 360/77.14; 360/67
[58] Field of Search ................ 360/77.14, 77.13, 360/77.15, 70, 67, 65

[56] References Cited

U.S. PATENT DOCUMENTS

| | | |
|---|---|---|
| 4,594,615 | 6/1986 | Nemoto et al. . |
| 4,607,297 | 8/1986 | Sonoda et al. . |
| 5,251,079 | 10/1993 | Yamada et al. ............ 360/77.14 |
| 5,359,473 | 10/1994 | Kaniwa et al. ............ 360/77.14 |

FOREIGN PATENT DOCUMENTS 63-157348  6/1988  Japan .

Primary Examiner—W. R. Young
Assistant Examiner—James L. Habermehl

[57] ABSTRACT

Automatic tracking control apparatus and method. The apparatus includes a low pass filter for detecting a pilot signal from a magnetic tape in a playback mode, an amplifier for amplifying the detected pilot signal at a varied gain, a reference pilot generator for generating reference pilot signals, a mixer for generating tracking control signals of 16 KHz and 46 KHz frequency components in accordance with differences between the respective reference pilot signals and the amplified pilot signal, first and second frequency detectors for detecting the tracking control signals of the 16 KHz and 46 KHz frequency components from output signals from the mixer, respectively, first and second level detectors for detecting levels of output signals from the first and second frequency detectors, respectively, a comparator for subtracting output levels from the first and second level detector from each other and outputting a tracking error signal in accordance with the subtracted result, and a microprocessor for generating a capstan motor control signal and a gain control signal in response to the tracking error signal from the comparator. Also, the microprocessor generates select signals for the generation of the reference pilot signals. The gain control signal is applied to the amplifier to vary the gain of the amplifier.

7 Claims, 6 Drawing Sheets

AUTOMATIC TRACKING CONTROL APPARATUS AND METHOD

BACKGROUND OF THE INVENTION

1. Field of the Invention

The present invention relates in general to the automatic control of tracking, and more particularly to an automatic tracking control apparatus and method in which a gain of a tracking error signal is automatically adjusted so that tracks of a magnetic tape can accurately be traced by video heads.

2. Description of the Prior Art

Referring to FIG. 1, there is shown a block diagram of a conventional automatic tracking control apparatus. As shown in this drawing, the automatic tracking control apparatus comprises a switch SW1 for selecting one of recording and playback modes, a low pass filter (LPF) 1 for detecting a pilot signal from high frequency signals read from a magnetic tape by video heads HD in the playback mode, an amplifier 2 for amplifying the detected pilot signal from the low pass filter 1, a reference pilot generator 3 for dividing a frequency signal from an oscillator OS by N to generate reference pilot signals, where N is determined according to select signals SEL1 and SEL2, and a mixer 4 for generating tracking control signals of 16 KHz and 46 KHz frequency components in accordance with differences between the respective reference pilot signals from the reference pilot generator 3 and the amplified pilot signal from the amplifier 2.

A first frequency detector 5 is provided in the automatic tracking control apparatus to detect the tracking control signal of the 16 KHz frequency component from output signals from the mixer 4 and wave-shape the detected tracking control signal. A first level detector 8 is adapted to detect a level of an output signal from the first frequency detector 5.

A second frequency detector 7 is also provided in the automatic tracking control apparatus to detect the tracking control signal of the 46 KHz frequency component from the output signals from the mixer 4 and wave-shape the detected tracking control signal. A second level detector 8 is adapted to detect a level of an output signal from the second frequency detector 7.

A comparator 9 is also provided in the automatic tracking control apparatus to subtract output levels from the first and second level detectors 6 and 8 from each other and output a tracking error signal in accordance with the subtracted result.

A microprocessor 10 is also provided in the automatic tracking control apparatus to generate a capstan motor control signal in response to the tracking error signal from the comparator 9. Also, the microprocessor 10 generates the select signals SEL1 and SEL2 for the generation of the reference pilot signals resulting in the generation of the tracking control signals of the 16 KHz and 46 KHz frequency components and applies the generated select signals SEL1 and SEL2 to the reference pilot generator 3.

The operation of the conventional automatic tracking control apparatus with the above-mentioned construction will hereinafter be described.

In the playback mode, selected under the control of the switch SW1, the high frequency signals recorded on the magnetic tape are read by the video heads HD and the pilot signal is detected from the read high frequency signals by the low pass filter 1. The pilot signal is used to control a phase of a capstan motor M. The pilot signal from the low pass filter 1 is applied to the amplifier 2 for amplification thereof.

On the other hand, the select signals SEL1 and SEL2 from the microprocessor to are applied to the reference pilot generator 3 for the generation of the reference pilot signals resulting in the generation of the tracking control signals of the 16 KHz and 46 KHz frequency components. The reference pilot generator 3 divides the frequency signal from the oscillator OS by N determined according to the select signals SEL1 and SEL2 from the microprocessor 10, so as to generate the reference pilot signals. The reference pilot signals from the reference pilot generator 3 and the amplified pilot signal from the amplifier 2 are applied to the mixer 4, which generates the tracking control signals of the 16 KHz and 46 KHz frequency components in accordance with the differences between the respective reference pilot signals from the reference pilot generator 3 and the amplified pilot signal from the amplifier 2.

Noticeably, the tracking control signals placed on the 16 KHz and 46 KHz frequencies are mis-tracking information in the case where the video heads HD trace tracks of the magnetic tape leaning to the left and right of the corresponding tracks.

The output signals from the mixer 4 are applied to the first and second frequency detectors 5 and 7. The first frequency detector 5 detects the tracking control signal of the 16 KHz frequency component from the output signals from the mixer 4 and wave-shapes the detected tracking control signal. Then, the first level detector 6 detects the level of the resultant tracking control signal of the 16 KHz frequency component from the first frequency detector 5.

Also, the second frequency detector 7 detects the tracking control signal of the 46 KHz frequency component from the output signals from the mixer 4 and wave-shapes the detected tracking control signal. Then, the second level detector 8 detects the level of the resultant tracking control signal of the 46 KHz frequency component from the second frequency detector 7.

The output levels from the first and second level detectors 6 and 8 are applied to the comparator 9, which subtracts the output levels from the first and second level detectors 6 and 8 from each other. In accordance with the subtracted result, the comparator 9 outputs the tracking error signal to the microprocessor 10. In response to the tracking error signal from the comparator 9, the microprocessor 10 outputs the capstan motor control signal for correction of the mis-tracking of the video heads HD. As a result, the phase of the capstan motor M is controlled according to the control signal from the microprocessor 10.

In brief, in the case where the video heads trace the tracks of the magnetic tape, on which the high frequency signals are recorded, and where the video heads to the left or right of the corresponding tracks, the tracking control signals are generated according to the differences between the respective reference pilot signals from the reference pilot generator 3 and the amplified pilot signal from the amplifier 2. Then, the tracking error signal is generated based on the difference between the tracking control signals and, thus, corrects the mis-tracking of the video head.

The tracking error signal may have different values according to an installation error of the video head, a frequency characteristic of the amplifier, a property of the magnetic tape or a recording manner of a video signal. In this connection, the conventional automatic tracking control apparatus has a disadvantage in that an amplification gain of the tracking error signal is constantly adjusted by the microprocessor in spite of the different values of the tracking error signal, resulting in an inaccurate control of the phase of the capstan motor. The inaccurate control of the capstan motor phase results in a jitter and a flutter which degrade both picture reproduction and sound reproduction.

SUMMARY OF THE INVENTION

Therefore, the present invention has been made in view of the above problem, and it is an object of the present invention to provide automatic tracking control apparatus and method in which a gain of a tracking error signal is adjusted so that the tracking error signal can have a fixed value and a phase of a capstan motor can thus accurately be controlled. It is another object of the present invention to provide an automatic tracking control apparatus and method in which a gain of a tracking error signal is varied according to a degree that video heads lean to the left or right of corresponding tracks of a magnetic tape, so that a phase of a capstan motor can accurately he controlled.

In accordance with one aspect of the present invention, there is provided an automatic tracking control apparatus comprising low pass filtering means for detecting a pilot signal from high frequency signals read from a magnetic tape by video heads in a playback mode; amplification means for amplifying the detected pilot signal from said low pass filtering means at a varied gain; reference pilot generation means for dividing a frequency signal from an oscillator by N to generate reference pilot signals, where N is determined according to select signals; mixing means for generating tracking control signals of 16 KHz and 46 KHz frequency components in accordance with differences between the respective reference pilot signals from said reference pilot generation means and the amplified pilot signal from said amplification means; first frequency detection means for detecting the tracking control signal of the 16 KHz frequency component from output signals from said mixing means and wave-shaping the detected tracking control signal; first level detection means for detecting a level of the resultant tracking control signal of the 16 KHz frequency component from said first frequency detection means; second frequency detection means for detecting the tracking control signal of the 46 KHz frequency component from the output signals from said mixing means and wave-shaping the detected tracking control signal; second level detection means for detecting a level of the resultant tracking control signal of the 46 KHz frequency component from said second frequency detection means; comparison means for subtracting output levels from said first and second level detection means from each other and outputting a tracking error signal in accordance with the subtracted result; and control means for generating a capstan motor control signal and a gain control signal in response to the tracking error signal from said comparison means, said control means generating the: select signals for the generation of the reference pilot signals and applying the generated select signals to said reference pilot generation means, said gain control signal being applied to said amplification means to vary the gain of said amplification means.

In accordance with another aspect of the present invention, there is provided an automatic tracking control method comprising the steps of (a) reading a pilot signal recorded on a magnetic tape, amplifying the read pilot signal and generating a tracking error signal based on the amplified pilot signal and reference pilot signals; (b) incrementing a gain of an amplifier if the tracking error signal is smaller than a first reference value, decrementing the gain of said amplifier if the tracking error signal is greater than or equal to the first reference value and is greater than a second reference value, outputting the present gain of said amplifier directly if the tracking error signal is greater than or equal to the first reference value and is smaller than or equal to the second reference value, amplifying the read pilot signal at the resultant fain of said amplifier and generating the tracking error signal on the basis of the amplified pilot signal and the reference pilot signals; and (c) controlling a phase of a capstan motor in response to the tracking error signal generated at said step (b).

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
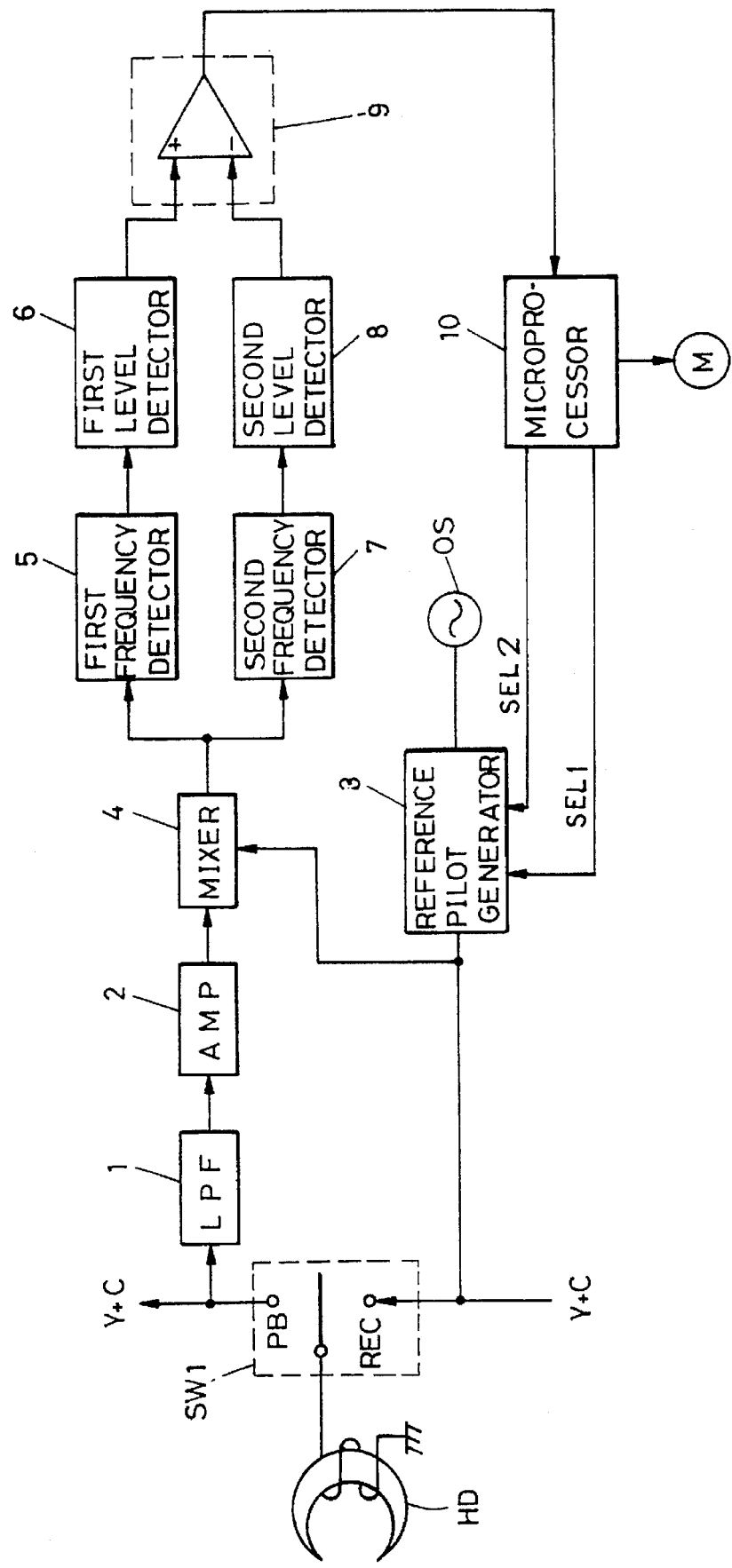
FIG. 1 is a block diagram of a conventional automatic tracking control apparatus.
Figure 2:
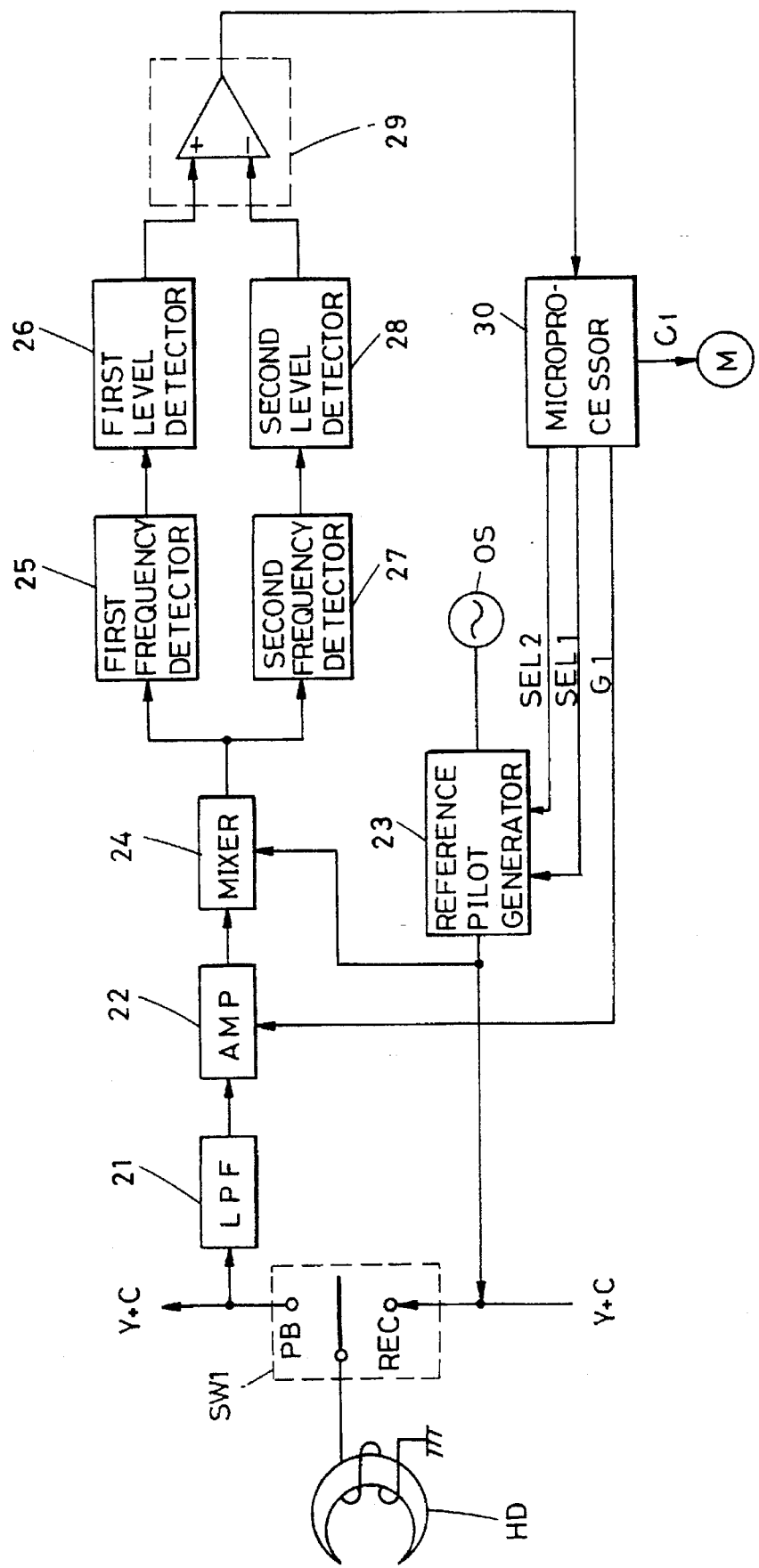
FIG. 2 is a block diagram of an automatic tracking control apparatus in accordance with an embodiment of the resent invention.

Referring to FIG. 2, there is shown a block diagram of an automatic tracking control apparatus in accordance with an embodiment of the present invention. As shown in this drawing, the automatic tracking control apparatus comprises a switch SW1 for selecting one of recording and playback modes, and a low pass filter (LPF) 21 for detecting a pilot signal from high frequency signals read from a magnetic tape by video heads HD in the playback mode.

Also, the automatic tracking control apparatus comprises an amplifier 22 for amplifying the detected pilot signal from the low pass filter 21 at a varied gain, a reference pilot generator 23 for dividing a frequency signal from an oscillator OS by N to generate reference pilot signals, where N is determined according to select signals SEL1 and SEL2, and a mixer 24 for generating tracking control signals of 16 KHz and 46 KHz frequency components in accordance with differences between the respective reference pilot signals from the reference pilot generator 23 and the amplified pilot signal from the amplifier The automatic tracking control apparatus also comprises a first frequency detector 25 for detecting the tracking control signal of the 16 KHz frequency component from output signals from the mixer 24 and wave-shaping the detected tracking control signal, a first level detector 26 for detecting a level of the resultant tracking control signal of the 16 KHz frequency component from the first frequency detector 25.

A second frequency detector 27 is provided in the automatic tracking control apparatus to detect the tracking control signal of the 46 KHz frequency component from the output signals from the mixer 24 and wave-shape the detected tracking control signal. A second level detector 28 is adapted to detect a level of the resultant tracking control signal of the 46 KHz frequency component from the second frequency detector 27.

A comparator 29 is also provided in the automatic tracking control apparatus to subtract output levels from the first and second level detectors 26 and 28 from each other and output a tracking error signal in accordance with the subtracted result. A microprocessor 30 is also provided in the automatic tracking control apparatus to generate a capstan motor control signal in response to the tracking error signal from the comparator 29. The microprocessor 30 also generates the select signals SEL1 and SEL2 for the generation of the reference pilot signals resulting in the generation of the tracking control signals of the 16 KHz and 46 KHz frequency components and applies the generated select signals SEL1 and SEL2 to the reference pilot generator 23. Also, the microprocessor 30 is adapted to generate a gain control signal G1 to vary the gain of the amplifier 22 in response to the tracking error signal from the comparator 29 and output the generated gain control signal G1 to the amplifier 22.

Figure 3:
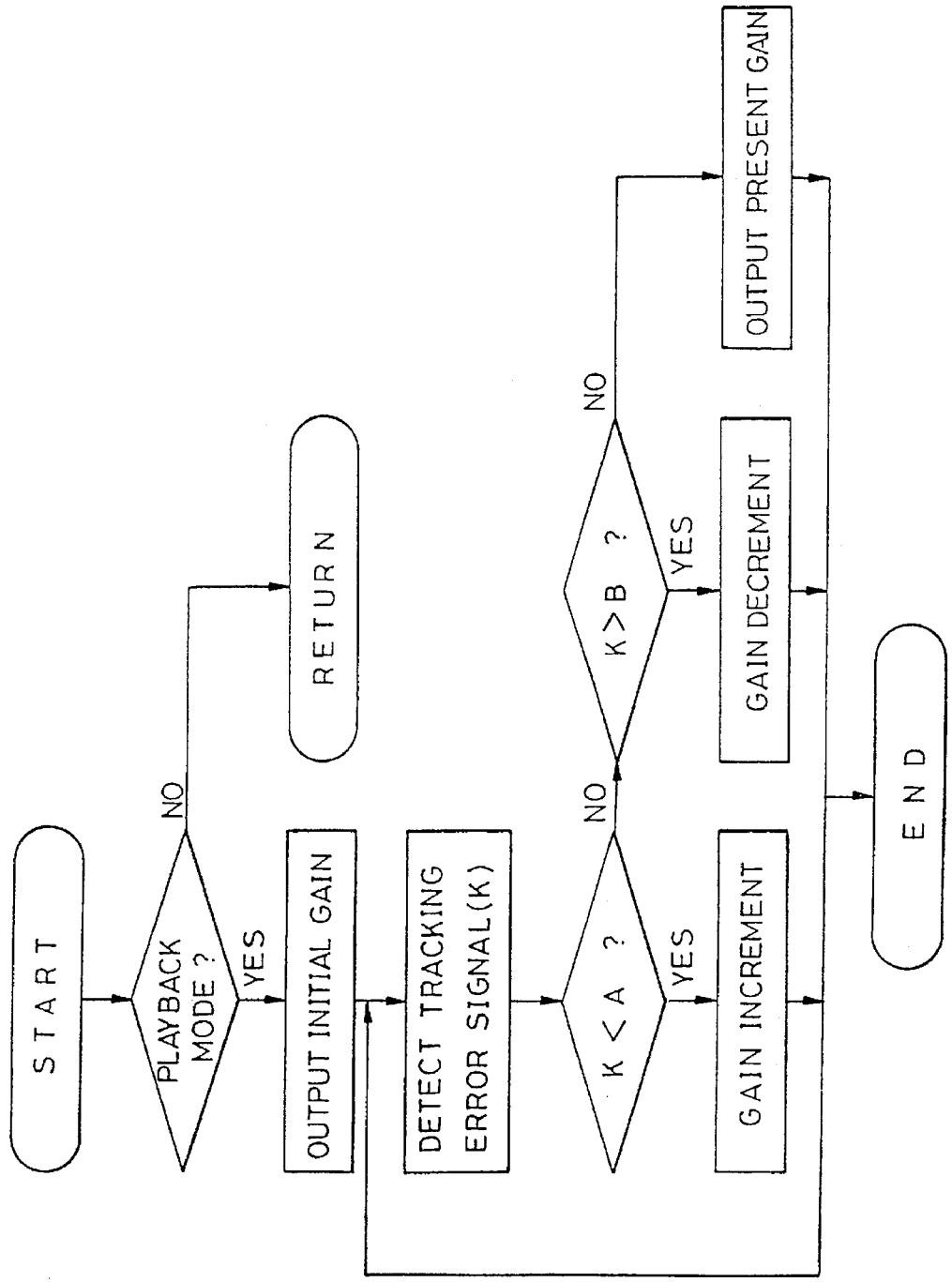
FIG. 3 is a flowchart illustrating an automatic tracking control method in accordance with the embodiment of the present invention.
Figure 4:
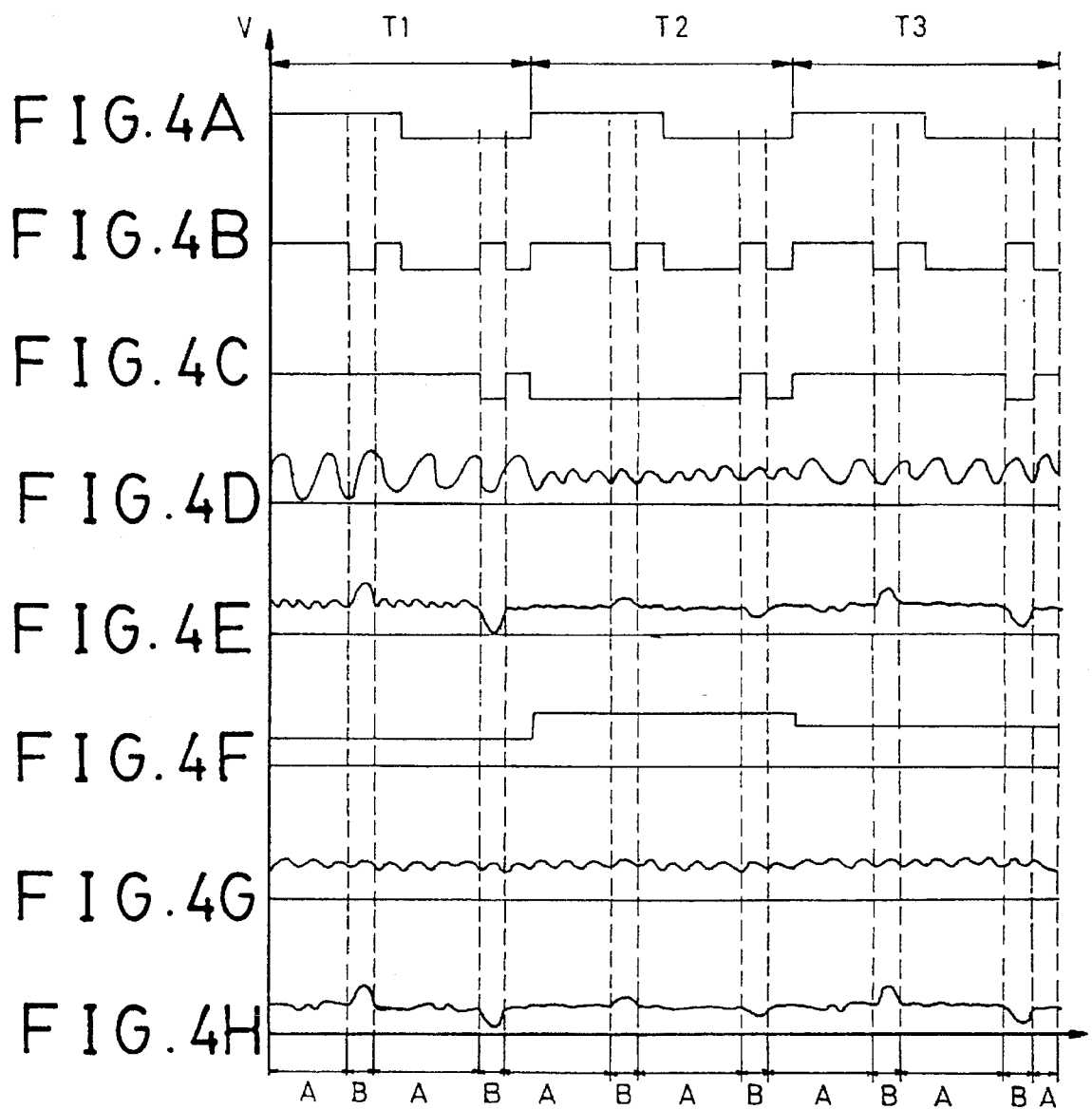
FIGS. 4A to 4H are waveform diagrams of signals from components in the automatic tracking control apparatus in FIG. 2.

The operation of the automatic tracking control apparatus with the above-mentioned construction in accordance with the embodiment of the present invention will hereinafter be described in detail with reference to FIGS. 2 to 4H. FIG. 3 is a flowchart illustrating an automatic tracking control method in accordance with the embodiment of the present invention and FIGS. 4A to 4H are waveform diagrams of the signals from the components in the automatic tracking control apparatus in FIG. 2.

In the playback mode, selected under the control of the switch SW1, the high frequency signals recorded on the magnetic tape are read by the video heads HD in response to a head switching signal as shown in FIG. 4A and the pilot signal is detected from the read high frequency signals by the low pass filter 21. The pilot signal is used to control a phase of a capstan motor M.

In this case, the video heads HD are switched in response to the head switching signal as shown in FIG. 4A to alternately trace corresponding tracks of the magnetic tape. The pilot signal from the low pass filter 21 is applied to the amplifier 22 for amplification thereof.

On the other hand, the select signals SEL1 and SEL2 from the microprocessor 30 as shown in FIGS. 4B and 4C are applied to the reference pilot generator 23 for the generation of the reference pilot signals resulting in the generation of the tracking control signals of the 16 KHz and 46 KHz frequency components. The reference pilot generator 23 divides the frequency signal from the oscillator OS by N determined according to the select signals SEL1 and SEL2 from the microprocessor 30 as shown in FIGS. 4B and 4C, so as to generate the reference pilot signals. The reference pilot signals from the reference pilot generator 23 and the amplified pilot signal from the amplifier 22 are applied to the mixer 24, which generates the tracking control signals of the 16 KHz and 46 KHz frequency components in accordance with the differences between the respective reference pilot signals from the reference pilot generator 23 and the amplified pilot signal from the amplifier 22

The tracking control signals of the 16 KHz and 46 KHz frequency components, generated from the mixer 24, are shown in FIG. 4D. Noticeably, the tracking control signals placed on the 16 KHz and 46 KHz frequencies are mistracking information in the case where the video heads HD trace the tracks of the magnetic tape leaning to the left and right of the corresponding tracks.

The output signals from the mixer 24 are applied to the first and second frequency detectors 25 and 27. The first frequency detector 25 detects the tracking control signal of the 16 KHz frequency component from the outpost signals from the mixer 24 and wave-shapes the detected tracking control signal. Then, the first level detector 26 detects the level of the resultant tracking control signal of the 16 KHz frequency component from the first frequency detector 25.

Also, the second frequency detector 27 detects the tracking control signal of the 46 KHz frequency component from the output signals from the mixer 24 and wave-shapes the detected tracking control signal. Then, the second level detector 28 detects the level of the resultant tracking control signal of the 46 KHz frequency component from the second frequency detector 27.

Then, the output levels from the first and second level detectors 26 and 28 are applied to the comparator 29, which subtracts the output levels from the first and second level detectors 26 and 28 from each other. As a result of the subtracting, the comparator 29 outputs the tracking error signal as shown in FIG. 4E to the microprocessor 30. In response to the tracking error signal from the comparator 29, the microprocessor 30 outputs the capstan motor control signal C1 for correction of the mis-tracking of the video heads HD and the gain control signal G1 for adjustment of the gain of the amplifier 22.

Namely, the microprocessor 30 outputs the gain control signal G1 as shown in FIG. 4F to the amplifier 22 if the tracking error signal from the comparator 29 is smaller than a first reference value A. In this case, the present gain of the amplifier 22 is incremented by the gain control signal G1 from the microprocessor 30. If the tracking error signal from the comparator 29 is greater than or equal to the first reference value A and is greater than a second reference value B, the microprocessor 30 outputs the gain control signal G1 to decrement the present gain of the amplifier 22. On the other hand, in the case where the tracking error signal from the comparator 29 is greater than or equal to the first reference value A and is smaller than or equal to the second reference value B, the present gain of the amplifier 22 is outputted as it is.

The pilot signal from the low pass filter 21 is amplified as shown in FIG. 4G by the amplifier 22 at the gain varied as mentioned above. Then, the tracking control signals are generated as shown in FIG. 4H based on the amplified pilot signal. The resultant tracking control signals are applied to the comparator 29, resulting in generation of the tracking error signal with a fixed value. In response to the tracking error signal from the comparator 29, the microprocessor 30 outputs the capstan motor control signal C1 for correction of the mis-tracking of the video heads HD. As a result, the phase of the capstan motor M is controlled according to the control signal C1 from the microprocessor 30.

The microprocessor 30 outputs the capstan motor control signal C1 in intervals A of FIG. 4H and the amplifier gain control signal G1 in intervals B of FIG. 4H.

Figure 5:
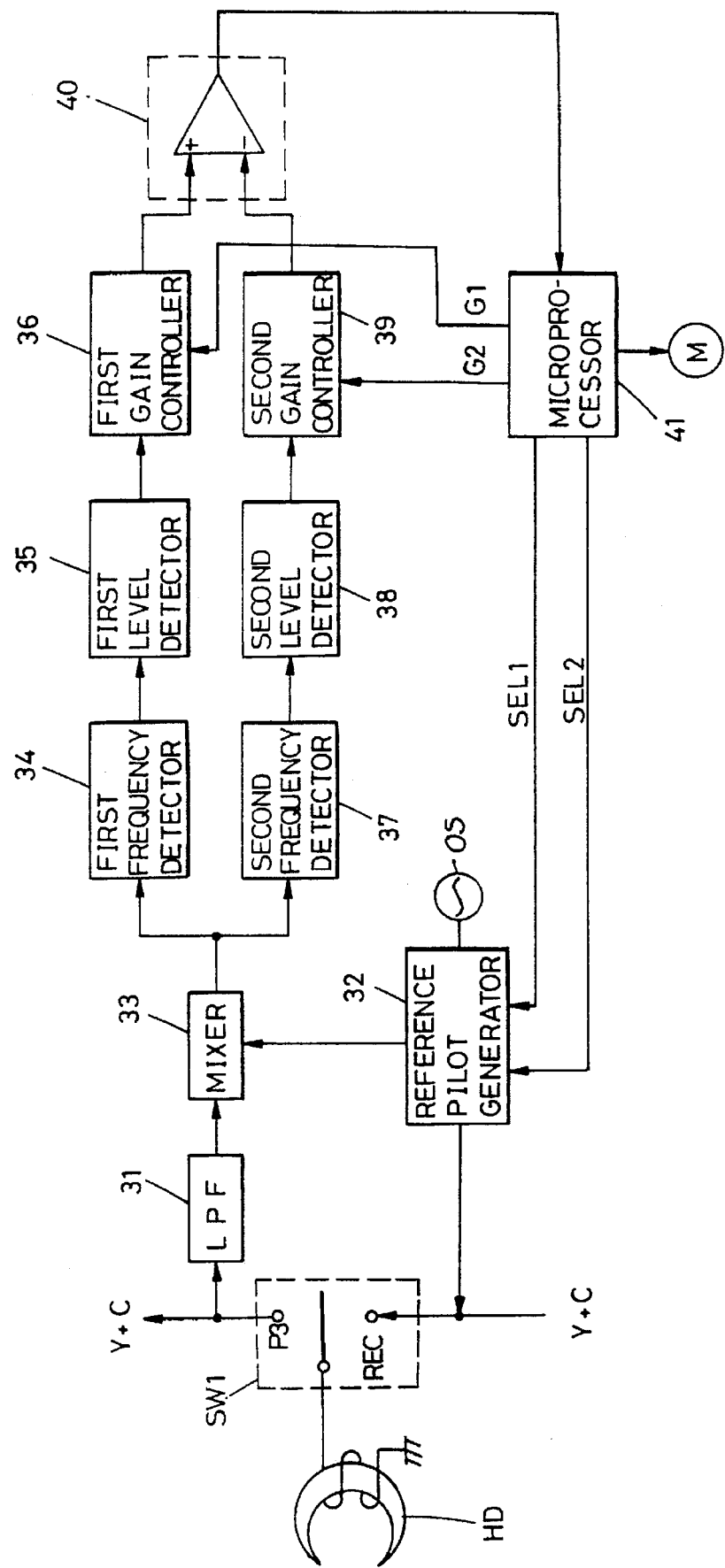
FIG. 5 is a block diagram of an automatic tracking control apparatus in accordance with an alternative embodiment of the present invention.

Referring to FIG. 5, there is shown a block diagram of an automatic tracking control apparatus in accordance with an alternative embodiment of the present invention. In this drawing, the construction of the second embodiment is substantially the same as that of the first embodiment in FIG. 2, with the exception that first and second gain controllers 36 and 39 are provided in addition to the construction of the first embodiment. Namely, a low pass filter 31, a reference pilot generator 32, a mixer 33, a first frequency detector 34, a first level detector 35, a second frequency detector 37, a second level detector 38, a comparator 40 and a microprocessor 41 in the second embodiment of FIG. 5 are the same as the low pass filter 21, the reference pilot generator 23, the mixer 24, the first frequency detector 25, the first level detector 26, the second frequency detector 27, the second level detector 28, the comparator 29 and the microprocessor 30 in the first embodiment of FIG. 2, respectively. Alternatively, the amplifier 22 in the first embodiment is omitted in the second embodiment.

The first and second gain controllers 36 and 29 are connected respectively to the first and second level detectors 35 and 38 to control gains of the output levels from the first and second level detectors 35 and 38 in response to gain control signals G1 and G2 from the microprocessor 41. Therefore, the tracks can more accurately be traced with the first and second gain controllers 36 and 39 used.

The operation of the automatic tracking control apparatus with the above-mentioned construction in accordance with the alternative embodiment of the present invention will hereinafter be described in detail with reference to FIGS. 5 to 6K. FIGS. 6A to 6K are waveform diagrams of the signals from the components in the automatic tracking control apparatus in FIG. 5.

In the playback mode, selected under the control of the switch SW1, the high frequency signals recorded on the magnetic tape are read by the video heads HD and the pilot signal is detected from the read high frequency signals by the low pass filter 31.

On the other hand, the select signals SEL1 and SEL2 from the microprocessor 41 are applied to the reference pilot generator 32 for the generation of the reference pilot signals resulting in the generation of the tracking control signals of the 16 KHz and 46 KHz frequency components. The reference pilot generator 32 divides the frequency signal from the oscillator OS by N determined according to the select signals SEL1 and SEL2 from the microprocessor 41, so as to generate the reference pilot signals. The reference pilot signals from the reference pilot generator 32 arid the pilot signal from the low pass filter 31 are applied to the mincer 33, which generates the tracking control signals of the 16 KHz and 46 KHz frequency components in accordance with the differences between the respective reference pilot signals from the reference pilot generator 32 and the pilot signal from the low pass filter 31.

The first frequency detector 34 detects the tracking control signal of the 16 KHz frequency component from the output signals from the mixer 33 and wave-shapes the detected tracking control signal. Then, the first level detector 35 detects the level of the resultant tracking control signal of the 16 KHz frequency component from the first frequency detector 34. The gain of the output level from the first level detector 35 is varied by the first gain controller 36 to a value determined according to the gain control signal G1 from the microprocessor 41.

Also, the second frequency detector 37 detects the tracking control signal of the 46 KHz frequency component from the output signals from the mixer 33 and wave-shapes the detected tracking control signal. Then, the second level detector 38 detects the level of the resultant tracking control signal of the 46 KHz frequency component from the second frequency detector 37. The gain of the output level from the second level detector 38 is varied by the second gain controller 39 to a value determined according to the gain control signal G2 from the microprocessor 41.

The output levels from the first and second level detectors 35 and 38, the gains of which are varied by the first and second gain controllers 36 and 39, are applied to the comparator 40. The comparator 40 subtracts the output levels from the first and second level detectors 35 and 38 from each other and outputs the tracking error signal to the microprocessor 41 in accordance with the subtracted result. The operation of controlling the phase of the capstan motor M on the basis of the tracking error signal from the comparator 40 is the same as that of the first embodiment.

Now, the operation Of the automatic tracking control apparatus with the above-mentioned construction in accordance with the alternative embodiment of the present invention will be described in more detail with reference to FIGS. 6A to 6K.

For example, it is assumed that the video heads HD lean to the right of the corresponding tracks of the magnetic tape as the tape is rapidly travelled.

Figure 6A:
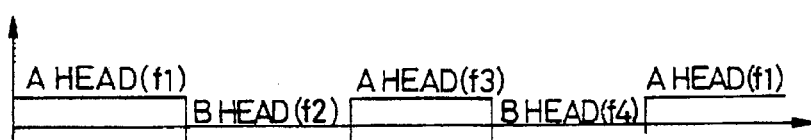
FIGS. 6A to 6K are waveform diagrams or signals from components in the automatic tracking control apparatus in FIG. 5.
Figure 6B:

The high frequency signals recorded on the magnetic tape are read by the video heads HD, being switched in response to a head switching signal as shown in FIG. 6A, and the pilot signal is detected as shown in FIG. 6B from the read high frequency signals by the low pass filter 31.

Figure 6C:
Figure 6D:
Figure 6E:
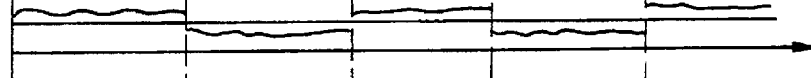
Figure 6F:
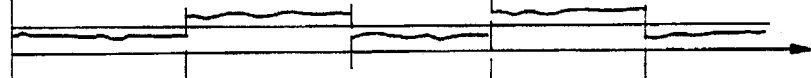

In this case, the tracking control signals from the first and second frequency detectors 34 and 37 are generated as shown in FIGS. 6C and 6D, respectively, on the basis of the assumption that the magnetic tape is rapidly travelled. The level of the tracking control signal as shown in FIG. 6C is shown in FIG. 6E and the level of the tracking control signal as shown in FIG. 6D is shown in FIG. 6F. From these drawings, it can be seen that the tracking control signal of the 16 KHz frequency component is larger in level and the tracking control signal of the 46 KHz frequency component is smaller in level because the video heads HD lean to the right of the corresponding tracks of the magnetic tape.

The levels of the tracking control signals as shown in FIGS. 6E and 6F are applied to the comparator 40, which generates the tracking error signal based on the difference between the two levels. The tracking error signal from the comparator 40 is applied to the microprocessor 41.

In response to the tracking error signal from the comparator 40, the microprocessor 41 outputs the gain control signals G1 and G2 to the first and second gain controllers 36 and 39 to correct the mis-tracking of the video heads HD resulting from the leaning to the right of the corresponding tracks of the magnetic tape.

Figure 6G:
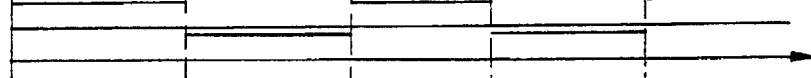
Figure 6H:
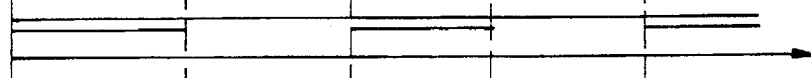

Namely, the gain of low level portions of the tracking control signal of the 16 KHz frequency component is incremented by the gain control signal G1 as shown in FIG. 6G, whereas the gain of high level portions of the tracking control signal of the 46 KHz frequency component is decremented by the gain control signal G2 as shown in FIG. 6F. As a result, the tracking control signals as shown in FIGS. 6I and 6J are applied to the comparator 40.

Figure 6I:
Figure 6J:
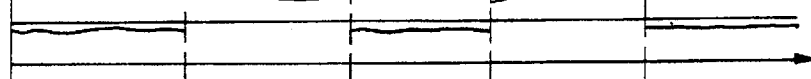
Figure 6K:
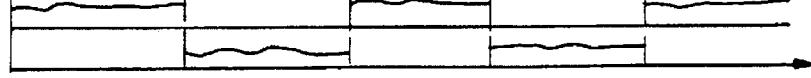

In result, the comparator 40 generates the tracking error signal as shown in FIG. 6K in accordance with the difference between the two levels as shown in FIGS. 6I and 6J, so as to control the phase of the capstan motor M.

On the other hand, the opposite operation is performed in the case where the video heads HD lean to the left of the corresponding tracks of the magnetic tape as the tape is slowly travelled.

As apparent from the above description, according to the present invention, the gains of the tracking control signals are adjusted so that the tracking error signal can always have a fixed value regardless of an installation error of the video head, a frequency characteristic of the amplifier, a property of the magnetic tape and a recording manner of a video signal. Namely, the gains of the tracking control signals of the 16 KHz and 46 KHz frequency components are adjusted so that the tracking error signal can always have the fixed value. Therefore, the phase of the capstan motor can accurately be controlled. The accurate control of the capstan motor phase has the effect of obtaining high picture and sound qualities.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic tracking control apparatus comprising:

low pass filtering means for detecting a pilot signal from high frequency signals read from a magnetic tape by video heads in a playback mode;

amplification means for amplifying the detected pilot signal from said low pass filtering means at a varied gain;

reference pilot generation means for dividing a frequency signal from an oscillator by N to generate reference pilot signals, where N iS determined according to select signals;

mixing means for generating tracking control signals of 16 KHz and 46 KHz frequency components in accordance with differences between the respective reference pilot signals from said reference pilot generation means and the amplified pilot signal from said amplification means;

first frequency detection means for detecting the tracking control signal of the 16 KHz frequency component from output signals from said mixing means and wave-shaping the detected tracking control signal;

first level detection means for detecting a level of the resultant tracking control signal of the 16 KHz frequency component from said first frequency detection means;

second frequency detection means for detecting the tracking control signal of the 46 KHz frequency component from the output signals from said mixing means and wave-shaping the detected tracking control signal;

second level detection means for detecting a level of the resultant tracking control signal of the 46 KHz frequency component from said second frequency detection means;

comparison means for subtracting output levels from said first and second level detection means from each other and outputting a tracking error signal in accordance with the subtracted result; and control means for generating a capstan motor control signal and a gain control signal in response to the tracking error signal from said comparison means, said control means generating the select signals for the generation of the reference pilot signals and applying the generated select signals to said reference pilot generation means, said gain control signal being applied to said amplification means to vary the gain of said amplification means.

2. An automatic tracking control apparatus as set forth in claim 1, further comprising:

first and second gain control means for controlling gains of the output levels from said first and second level detection means in response to corresponding gain control signals from said control means, respectively;

whereby tracks of the magnetic tape can accurately be traced by the video heads.

3. The automatic tracking control apparatus as set forth in claim 1, wherein said amplification means receives the detected pilot signal directly from said low pass filtering means.

4. An automatic tracking control method comprising the steps of:

(a) reading a pilot signal recorded on a magnetic tape, amplifying the read pilot signal and generating a tracking error signal based on a comparison of the amplified pilot signal and reference pilot signals;

(b) incrementing a gain of an amplifier if the tracking error signal is smaller than a first reference value, decrementing the gain of said amplifier if the tracking error signal is greater than or equal to the first reference value and is greater than a second reference value, outputting the present gain of said amplifier directly if the tracking error signal is greater than or equal to the first reference value and is smaller than or equal to the second reference value, amplifying the read pilot signal at the resultant gain of said amplifier and generating the tracking error signal on the basis of the amplified pilot signal and the reference pilot signals; and (c) controlling a phase of a capstan motor in response to the tracking error signal generated at said step (b).

5. The method of claim 4, further comprising the step of:

(d) repeating steps (b) and (c), in order-to continue controlling the phase of the capstan motor.

6. An automatic tracking control apparatus comprising:

means for reading a pilot signal recorded on a magnetic tape, amplifying the read pilot signal and generating a first tracking error signal from the output of a comparison means based on the amplified pilot signal and reference pilot signals;

gain determination means for incrementing a gain of an amplifier if the first tracking error signal is smaller than a first reference value, decrementing the gain of said amplifier if the first tracking error signal is greater than or equal to the first reference value and is greater than a second reference value, outputting the present gain of said amplifier directly if the first tracking error signal is greater than or equal to the first reference value and is smaller than or equal to the second reference value, amplifying the read pilot signal at the resultant gain of said amplifier and generating a second tracking error signal on the basis of the amplified pilot signal and the reference pilot signals, and means for controlling a phase of a capstan motor in response to the second tracking error signal.

7. The apparatus of claim 6, wherein said gain determination means increments the gain if the first tracking error signal is smaller than the first reference value and regardless of a value of the present gain; decrements the gain if the first tracking error signal is greater than or equal to the first reference value and greater than the second reference value and regardless of the value of the present gain; outputs the present gain if the first tracking error signal is greater than or equal to the first reference value and smaller than or equal to the second reference value, and regardless of the value of the present gain.

* * * * *